July 21, 1953  O. R. BREKLE  2,646,085
MACHINE FOR FORMING WIRE GARMENT HANGERS
Filed Feb. 16, 1948  7 Sheets-Sheet 1
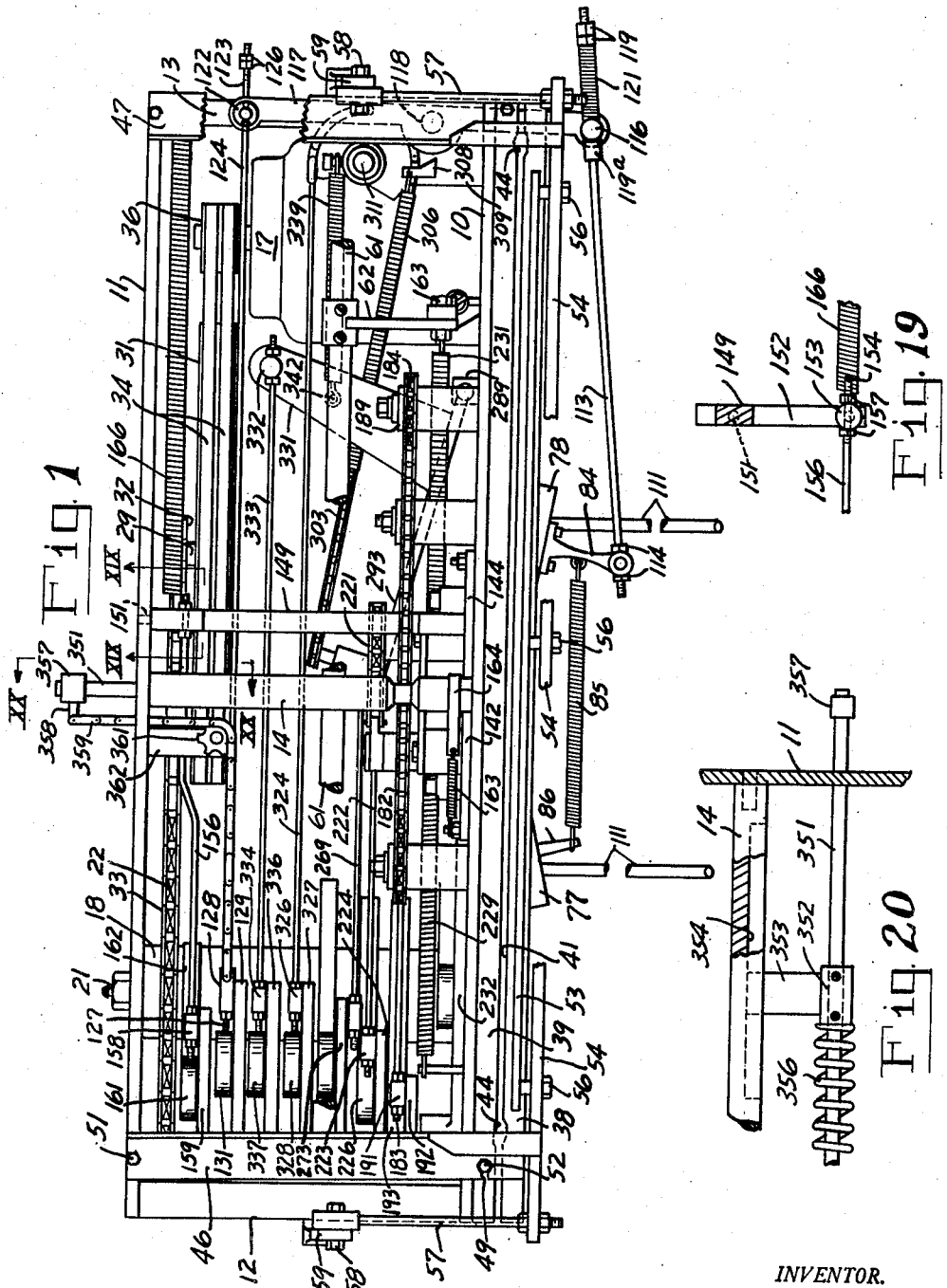
INVENTOR.
Oliver R. Brekle
BY
Jennings & Carter
Attorneys

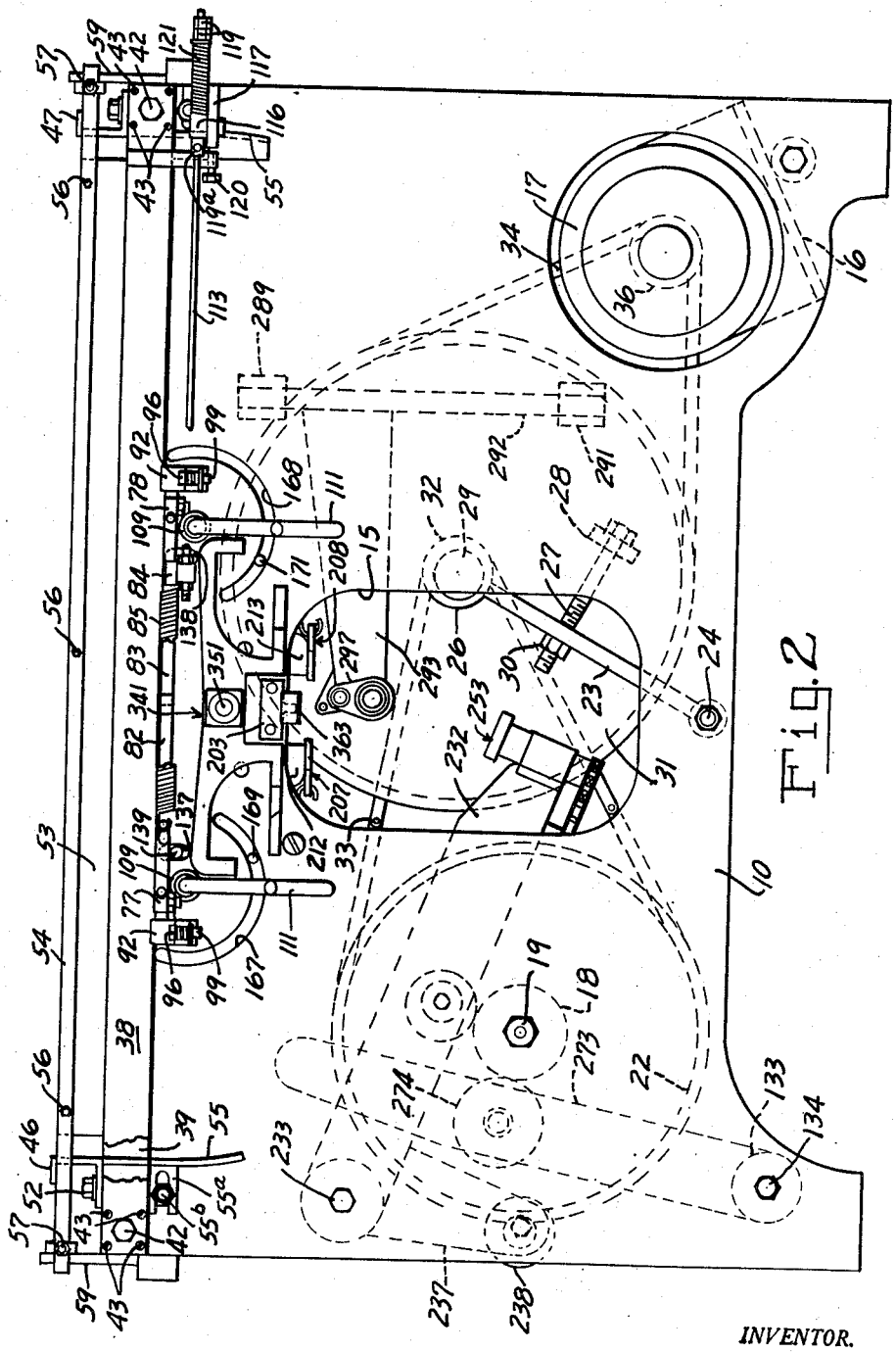

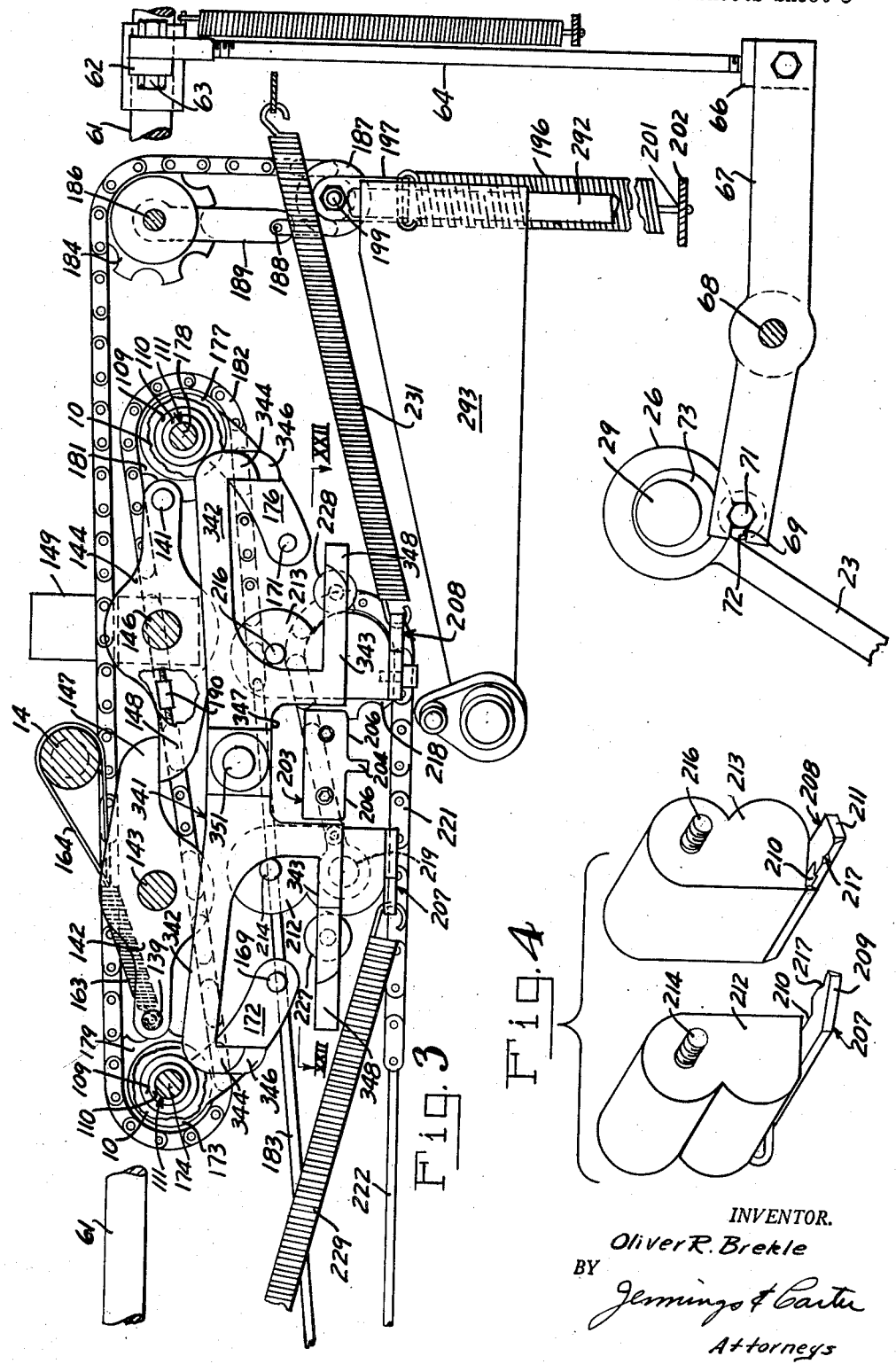

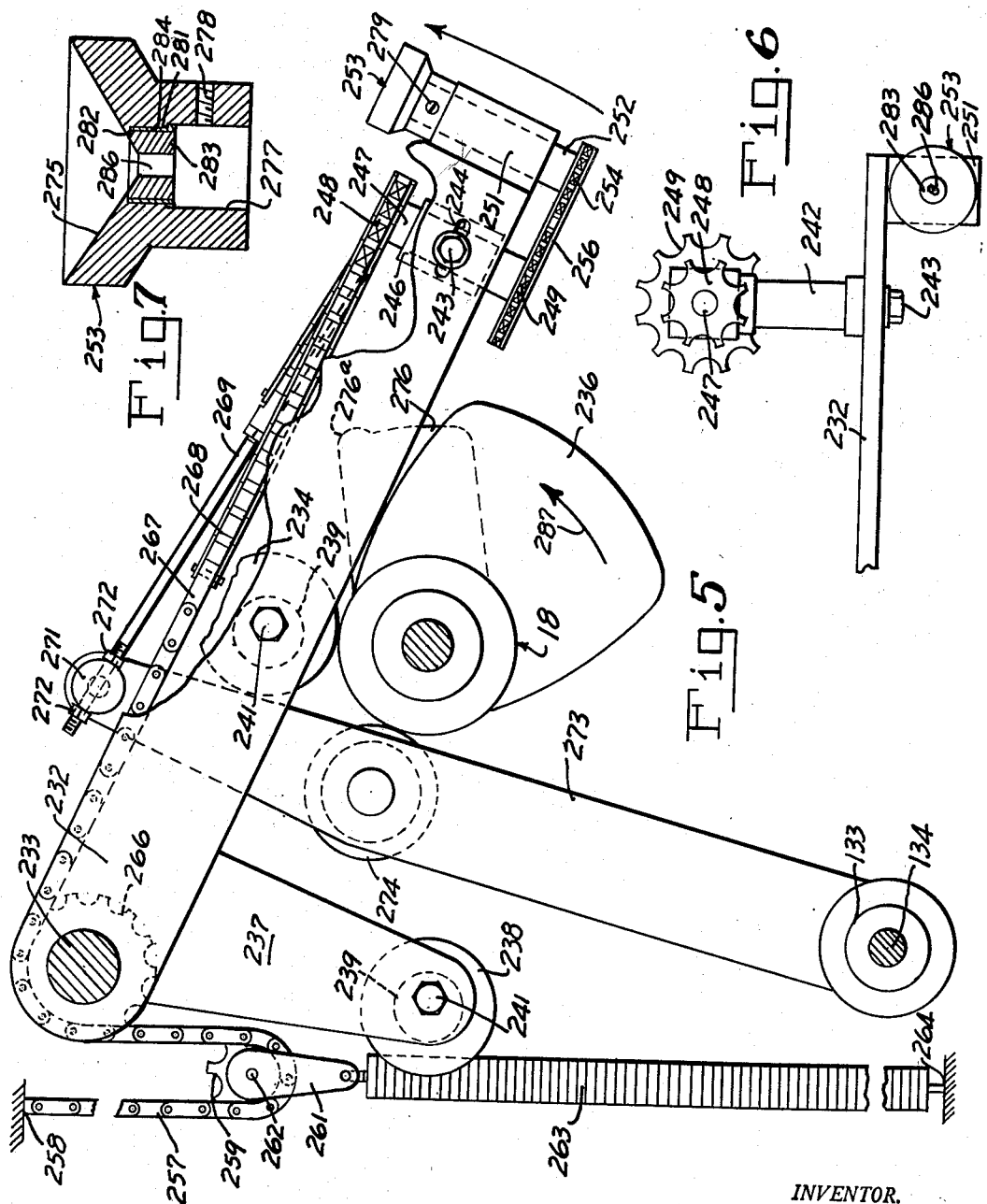

July 21, 1953  O. R. BREKLE  2,646,085
MACHINE FOR FORMING WIRE GARMENT HANGERS
Filed Feb. 16, 1948  7 Sheets-Sheet 5
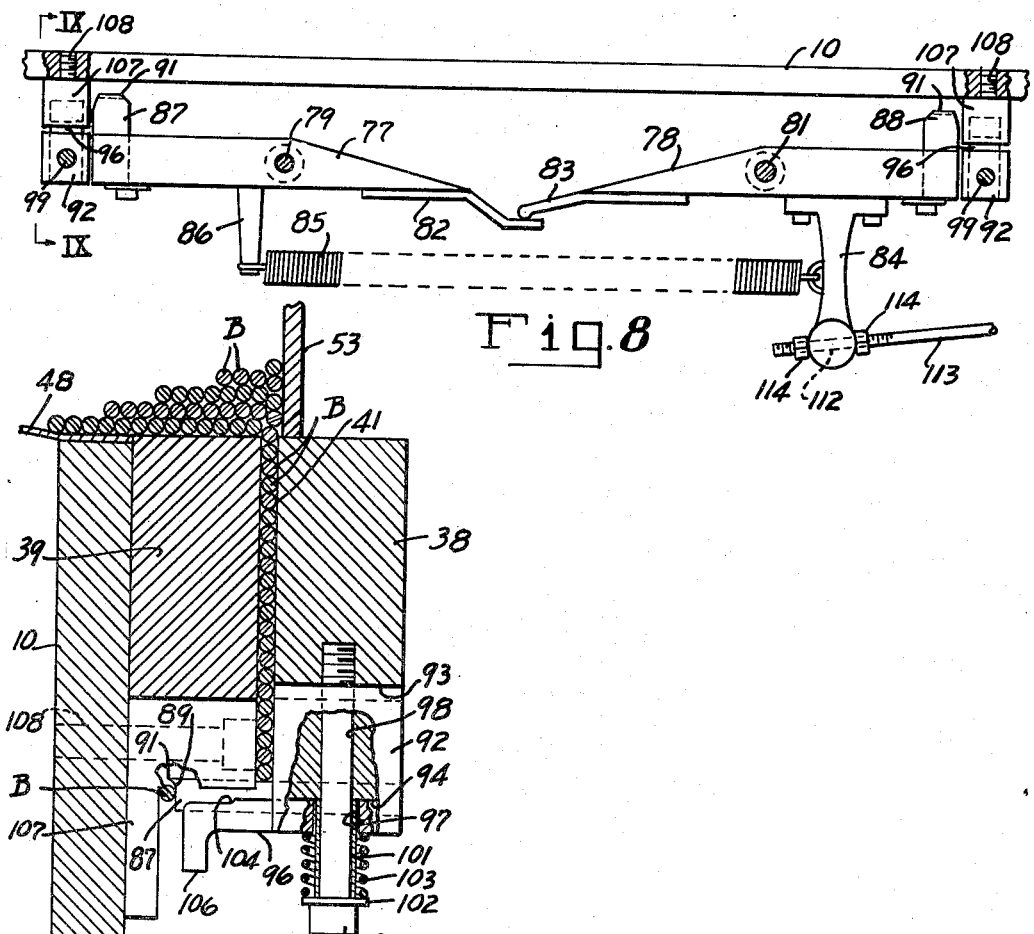
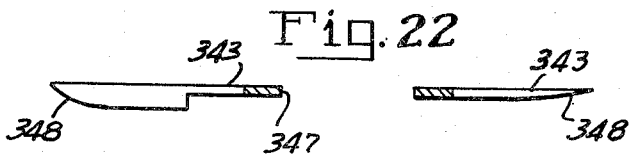
INVENTOR.
Oliver R. Brekle
BY
Jennings & Carter
Attorneys July 21, 1953  O. R. BREKLE  2,646,085
MACHINE FOR FORMING WIRE GARMENT HANGERS
Filed Feb. 16, 1948  7 Sheets-Sheet 6
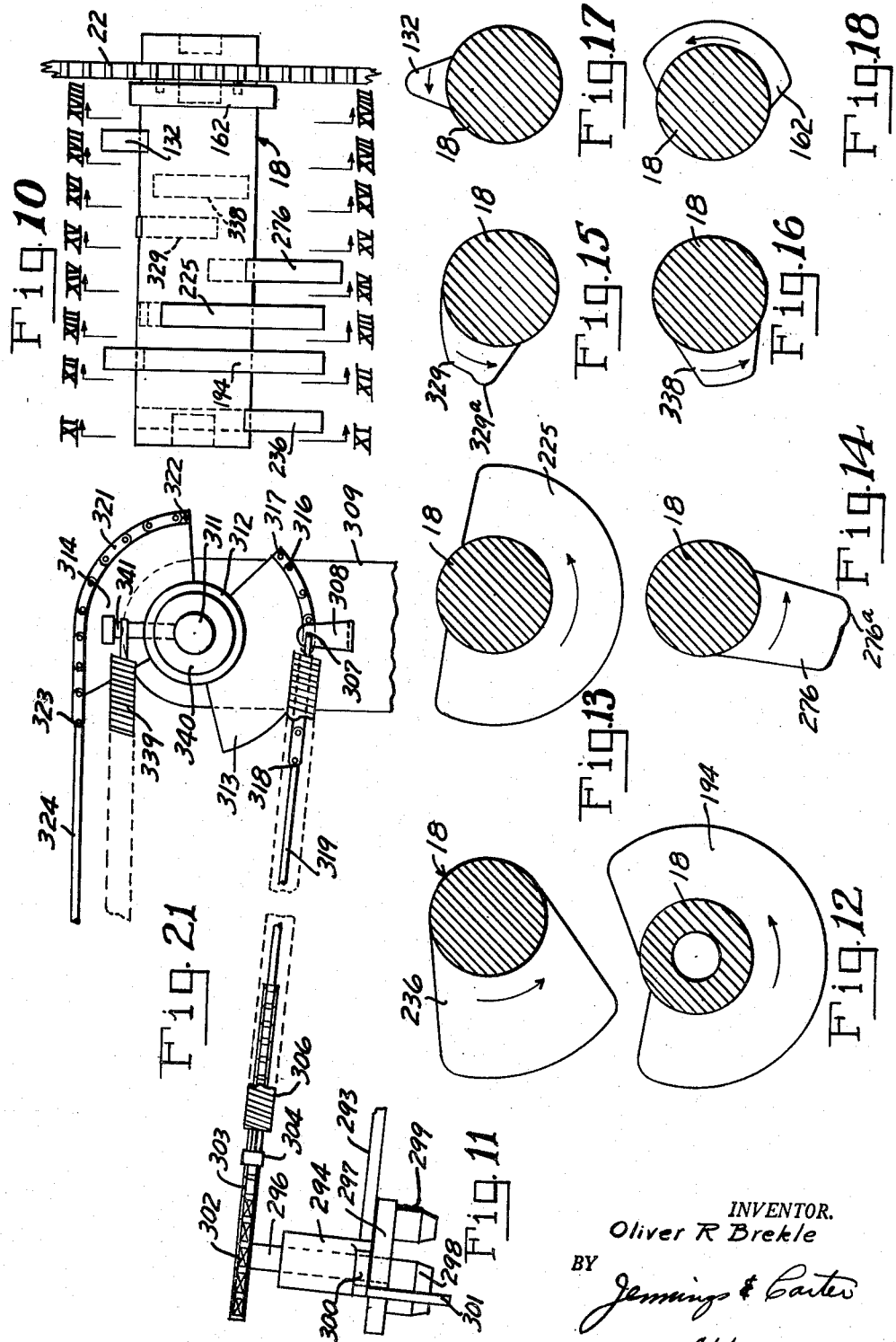
INVENTOR.
Oliver R Brekle
BY
Jennings & Carter
Attorneys

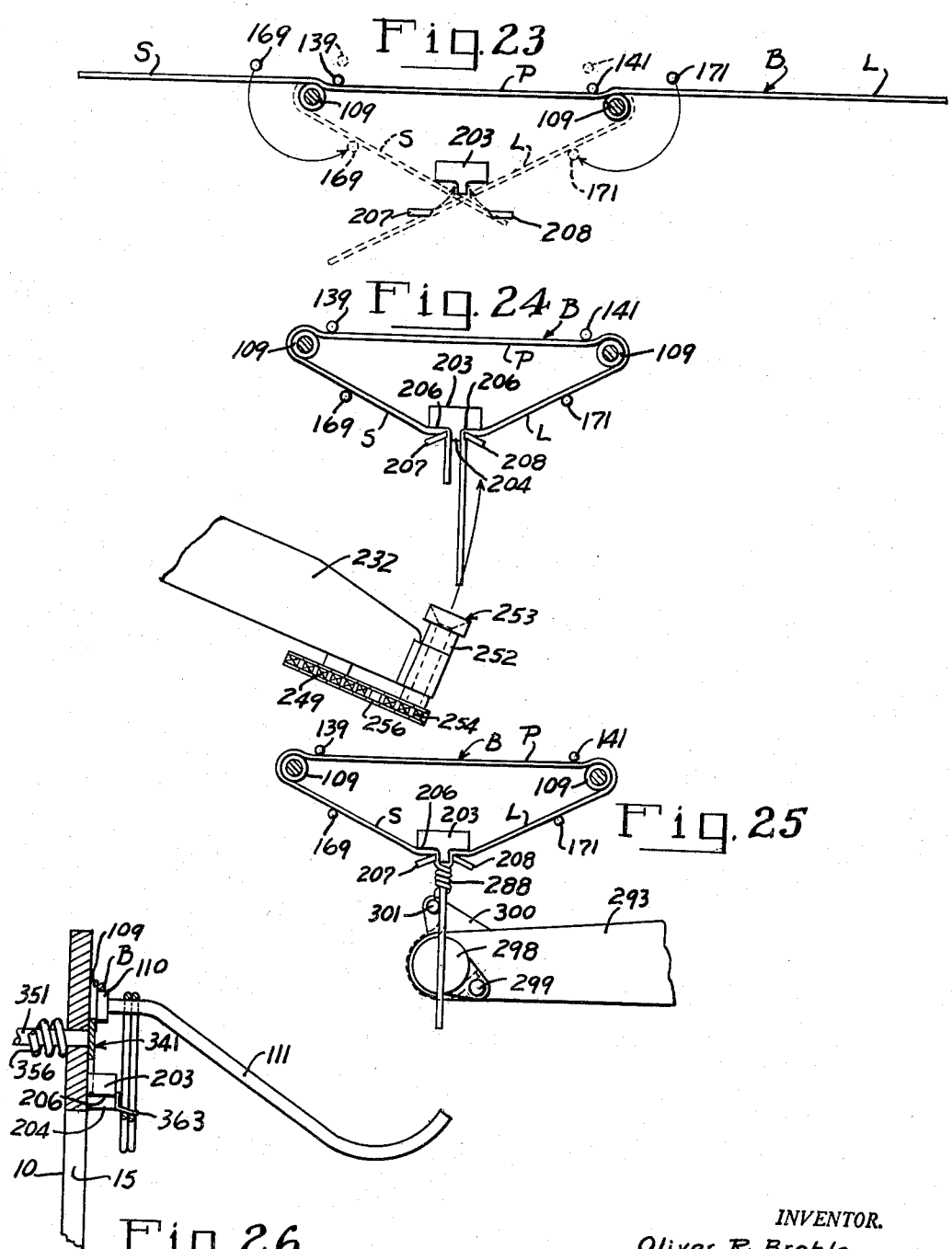

Patented July 21, 1953

2,646,085

UNITED STATES PATENT OFFICE 2,646,085

MACHINE FOR FORMING WIRE GARMENT HANGERS

Oliver R. Brekle, Birmingham, Ala., assignor to M and B Metal Products Company, Birmingham, Ala., a partnership composed of Milton M. Magnus and Oliver R. Brekle Application February 16, 1948, Serial No. 8,635

6 Claims. (Cl. 140—81.5)

My present invention relates to a machine for making wire garment hangers and has for an object the provision of apparatus of the character described which shall form garment hangers from individual, pre-cut and pre-straightened blanks, which shall be compact, positive in operation, shall have a high rate of production, and in which the several motions to effect formation of the hangers are derived, transmitted, and utilized by mechanisms greatly simplified over that heretofore existing, thereby providing apparatus requiring a minimum of maintenance.

A more specific object of my invention is to provide apparatus of the character described in which all of the actual hanger forming motions are derived from a common cam shaft, and are transmitted directly and in substantially straight lines to the part or parts utilized in forming the hangers, thereby decreasing the stresses and strains imposed on the component parts of the machine, and hence reducing wear throughout.

Another object is to provide apparatus of the character designated embodying a pair of pivotally mounted forming jaws disposed to cooperate with an anvil placed therebetween, together with a common actuating mechanism for closing the jaws successively against the anvil, thereby assuring that the ends of the blank are correctly positioned to enter the twisting mechanism.

Another object is to provide an improved feed arrangement for supplying blanks one at a time to the forming mechanism, together with an improved takeoff mechanism for removing the lowermost blank of a stack and to position and hold the same during the forming operations.

Another object is to provide a pair of interconnected pivotally mounted pins disposed to place rounded, upwardly disposed bends in the pants bar portion of the hanger, adjacent the ends thereof, one of which pins is rotatable responsive only to rotation of the other, together with a single means to rotate said other pin, thereby to use a single motion for both pins.

Another object is to provide a shank forming twister head pivotally mounted on an arm to move in a vertical plane and disposed to receive the free end of the blank, together with simplified cam means and followers for moving the twister into and out of engagement with the ends of the blanks after they are brought into parallelism, thus accomplishing such motions as if produced by a box cam, but without the expense and complications of a box cam.

Another object is to pivotally mount the hook former for outward movement in a horizontal plane into engagement with the long end of the blank, thus to form the coat hanger hook, the outward motion of the hooker being obtained by a straight line pull on a link connected to an arm on one side of the pivot point of the hooker supporting member.

Further objects are to provide improved means for maintaining a feed slot of equal width throughout its length through which the blanks pass to the forming mechanism; to provide resilient means through which a pair of members adapted to take off blanks from the bottom of the slot is operated, thus preventing damage in the event a faulty blank becomes jammed; to provide mechanism wherein the injector and ejector are operated from a common cam; to construct the ejector in such a manner that the formed hanger is ejected evenly and without bending, together with a frictional stop associated with the hangers and disposed to hold a few hangers in position for final ejection one at a time by subsequently formed hangers, thereby preventing the same from swinging back into the moving parts of the machine and becoming entangled therewith; and to utilize generally throughout springs for returning the motion producing, cam actuated arms and the parts connected thereto.

Apparatus embodying features of my invention is illustrated in the accompanying drawing forming a part of this application in which:

Fig. 1 is a plan view with certain parts broken away and with the plate forming the bottom of the blank hopper removed for the sake of clarity;

Fig. 2 is a front elevational view partly broken away, only a few of the internal parts being indicated by dotted lines;

Fig. 3 is an enlarged view of the mechanisms disposed adjacent the front center portion of the machine and with the front plate removed, certain parts being in section and broken away, the parts being shown in the positions they occupy after a blank is partially formed into a hanger;

Fig. 4 is a detached perspective view of the pivotally mounted shank forming jaws;

Fig. 5 is a sectional view illustrating the twister supporting arm and motion therefor;

Fig. 6 is a plan view of the twister head and immediate drive means therefor with the chains removed;

Fig. 7 is an enlarged detail sectional view through the twister head;

Fig. 8 is a fragmental plan view, partly in section, of the blank feeding or takeoff mechanism with the elements thereof in wire feeding position;

Fig. 9 is an enlarged sectional view partly broken away and taken generally along the line IX—IX of Fig. 8;

Fig. 10 is a plan view of the main cam shaft;

Figs. 11 to 18 inclusive are detail sectional views taken along the respective lines indicated on Fig. 10, and illustrating the configuration of the cams, all of the cams being disposed at the proper relative angularity with respect to each other;

Fig. 19 is a detail sectional view taken along the line XIX—XIX of Fig. 1;

Fig. 20 is a detail sectional view taken along the line XX—XX of Fig. 1;

Fig. 21 is a fragmental plan view partly broken away of the hooker and motion therefor;

Fig. 22 is a detail sectional view taken along line XXII—XXII of Fig. 3;

Figs. 23 to 25 inclusive are diagrammatic views illustrating the formation of a hanger; and Fig. 26 is a diagrammatic sectional view illustrating a plurality of hangers being discharged from the machine.

Referring now to the drawing for a better understanding of my invention, my improved machine comprises a relatively heavy front plate 10 and a relatively heavy rear plate 11. The plates are braced at their upper ends by means of spacing rods 12 and 13 and are further braced by means of the various cross shafts and other elements forming parts of the mechanism, which will appear as the description thereof proceeds. The plates are braced adjacent their centers by means of a cross rod 14 which also acts as a guide and centering means for certain parts of the apparatus as will later appear. At the lower righthand corner as viewed in Fig. 2, the plates are further braced by means of a rod and a motor mounting plate 16 is mounted on the rod and supporting an electric motor 17. The front plate 10 is cut out as indicated at 15, the opening being located slightly off center to the left as viewed in Fig. 2.

All motions, except one, are derived from a main cam shaft 18 journaled at either end on bearings 19 and 21 mounted on the front and rear plates 10 and 11, respectively. Mounted on the cam shaft 18 is a sprocket 22.

Mounted adjacent the center of the machine is an upwardly extending plate 23 pivoted between the front and rear plates 10 and 11 on a shaft 24. The plate 23 carries a bearing 26 at its upper end and the same may be moved to the right as viewed in Fig. 2 by means of a screw 27 passing through a lug 28 fast on the rear side of plate 10. A nut 30 is placed on the left side of plate 23, and the end of bolt 27 screws therein. The bearing 26 carries a shaft 29 and fast to the shaft 29 is a pulley 31 and a sprocket 32. A chain 33 passes over the sprockets 22 and 32, and a pair of V-belts 34 pass over the pulley 31 and a pulley 36 on the motor 17. By running in on the screw 27, chain 33 may be tightened, and the belts 34 may be tightened by pivoting the motor mounting plate on its rod.

Referring now more particularly to Figs. 1, 2, 8 and 9, mechanism for feeding the pre-cut and pre-straightened blanks to my improved apparatus will now be described. Mounted at the upper edge of the front plate 10 are a pair of relatively thick bars 38 and 39. As shown more clearly in Figs. 1 and 9, the bars are spaced from each other to provide a vertical slot 41 for receiving a plurality of blanks B in superposed relation. The front bar 38 is secured to the rear bar 39 by means of a relatively large stud 42 passing loosely through both bars and threaded into an end of one of the cross members forming a part of the framework. Disposed about each of the studs 42 are four set screws 43 which abut against the face of the rear bar 39. By running in on the screws 43 selectively, the outer bar 38 may be warped or distorted, thereby to maintain the surfaces of the bars forming the slot 41 in parallelism. Accurate machining of the bars is thus eliminated.

Each of the bars 38 and 39 are provided with vertically disposed recesses 44 of greater width than the slot 41 for passing the ends of a blank which may have become damaged in the straightening and cutting operation. Adjacent the ends of the bars 38 and 39 are angles 46 and 47 which are disposed to guide the blanks endwise while on the upper plate 48 forming the bottom of the blank feed hopper. See Fig. 9. The angle 46 is provided at its front end with a slot 49 and is pivotally mounted at its rear end on a stud 51 threaded into the rear plate 11. A stud 52 passes through the slot 49 thereby permitting the forward end of the guide 46 to be moved longitudinally of the machine, thus to form a trough having sides converging from the rear of the machine toward slot 41. This arrangement provides an accurate means for positioning the blanks with the ends overhanging the forming mechanism in the correct relation, and to accommodate the machine to blanks of different lengths.

Projecting downwardly through the opening 41 adjacent the outer ends of the enlarged recesses 44 are fingers 55 curved inwardly toward the center of the machine. The left hand finger may be made adjustable by means of a slotted bracket 55a and a stud 55b. The fingers serve to guide the blanks endwise while being discharged from the slot, as will later appear.

Disposed to reciprocate immediately forward of the front edge of the slot 41 is an agitator bar 53. Blanks B fed onto the plate 48 are contacted by the reciprocating bar 53 which facilitates their entry, one at a time, into the slot 41. As shown in Figs. 1 and 2, the agitator bar 53 is supported on a cross member 54 by means of studs 56. Connected to each end of the cross member 54 are rods 57, pivotally connected at their other ends by means of bolts 58 to the ends of a pair of upstanding arms 59. The arms 59 are carried on opposite ends of a shaft 61, journaled in suitable bearings, not shown, at the ends of the machine.

Near the righthand end of the machine as viewed in Fig. 1, the shaft 61 is provided with a forwardly extending arm 62. Pivotally connected as at 63 to the outer end of arm 62 is a depending rod 64. The rod 64 connects at its lower end to a pivot block 66 secured to one end of an arm 67. The arm 67 is journaled on a stud 68 screwed into the rear side of plate 10 and the opposite end of the arm is slotted as indicated at 69. Rotatably mounted on a stud 71 disposed in the slot 69 is a roller 72. Mounted on the shaft 29 to contact the roller 69 is an eccentric 73. It will be apparent that when the shaft 29 rotates, the agitator bar 53 reciprocates back and forth slightly adjacent the front edge of slot 41, thereby causing the blanks B to enter the slot.

Referring again more particularly to Figs. 8 and 9 of the drawing, the mechanism for removing the lowermost blank B of the stack of blanks in the slot 41 and positioning the same for the forming operations will now be described. Beneath the forward heavy bar 38 forming the front of slot 41 are a pair of injector arms 77 and 78, pivotally mounted on studs 79 and 81. The inner ends of the arms are provided with extensions 82 and 83. As shown clearly in Fig. 8, the extension 82 overlaps the extension 83 so that when arm 78 is rotated as will be explained, the arm 77 rotates oppositely. Arm 78 is provided with an outwardly projecting bracket 84 and arm 77 is provided with an outwardly projecting pin 86. The spring 85 is connected at either end to the bracket 84 and pin 86, and serves to bias the extension 82 into contact with the extension 83.

The outer ends of the arms 77 and 78 carry injector fingers 87 and 88 which are identical in construction and only one of which will be described in detail. As shown in Fig. 9, the rearward end of each of the fingers 87 and 88 is provided with an undercut rounded end 89 which is disposed to engage between the lowermost and the next upper blank of the stack, thereby to remove the lowermost blank from the stack. The undercut surface 89 on the ends of the fingers 87 and 88 terminate in a rearwardly projecting lip 91 disposed to enter between the lowermost and the next upper blank.

Closely adjacent the outer end of the arms 77 and 78, adjacent the fingers 87 and 88, are resiliently mounted escapement units for supporting the stack of blanks B when the fingers are withdrawn from beneath the slot 41. Each of these elements comprises a block 92 fitting in a slot 93 provided in the lower side of the bar 38. Each of the blocks 92 is in turn recessed on their bottom sides as at 94 to loosely receive an elongated plate 96. The plate 96 and the block 92 are drilled as at 97 and 98, respectively. A stud 99 passes through the opening 98 and is threaded into the underside of the heavy bar 38. A length of tubing 101 is interposed between a washer 102 at the head of the stud and the under side of the block 92. The opening 97 in the plate 96 is sufficiently large to loosely pass the tubing 101. A spring 103 is interposed between the washer 102 and the lower side of the plate 96. At its inner end the plate 96 is reduced in thickness as indicated at 104 and is provided with a depending leg 106.

Immediately behind each block 92 is an L-shaped block 107 secured to the plate 10 by means of a stud 108. As shown in Fig. 9, the front edge of the block 107, together with the rear sides of the block 92 form a continuation of the slot 41 down which the blanks B pass. As shown more clearly in Figs. 2 and 3 of the drawing, just inwardly toward the center of the machine from the blocks 92 I provide a pair of round bosses 109 having a forwardly disposed reduced portion 110, and secured directly to the front of the plate 10. Projecting outwardly from the reduced portion 110, and disposed centrally thereof are a pair of downwardly sloping rods 111 onto which hangers formed by my improved machine are delivered. The portions 110 of the bosses 109 serve as stationary supporting members about which the blank is bent to form the upwardly sloping coat hanging portion of the garment hanger at the point of junction therewith to the pants bar portion.

The forward end of the outstanding bracket 84 is drilled as indicated at 112 to receive the threaded end of a pull rod 113. Nuts 114 secure the end of the rod to the end of the arm 84. As shown more clearly in Figs. 1 and 2, the opposite end of rod 113 is threaded and passes loosely through a pivot block 116 pivotally mounted on the outer end of a rearwardly extending arm 117. The arm 117 is pivotally mounted to a suitable part of the framework as indicated at 118. At its righthand end the rod 113 carries a pair of lock nuts 119, and between the nuts 119 and the pivot block 116 is a spring 121. A collar 119a is secured to the rod on the opposite side of the pivot block. An adjustable stop 120 limits the leftward movement of the forward end of arm 117. See Fig. 2.

The rear end of the arm 117 carries a pivot block 122. Passing loosely through the block 122 is one end 123 of a pull rod 124, provided with lock nuts 126. The opposite end 127 of the pull rod 124 passes through a pivot block 128 pivotally mounted on the end of a lever 129, similar in all respects to the lever 273 for actuating the twister, shown in Fig. 5 of the drawing, and which will be described in detail in connection with the twister. The lever 129 carries on one side a roller 131 disposed to bear against a cam 132 mounted on the cam shaft 18. See Fig. 17. It will be understood that the lever 129 is pivoted at its lower end to a shaft 133 extending between the front and rear plates 10 and 11. The shaft 133 is pivotally mounted between the plates 10 and 11 by means of studs 134, see Fig. 2, only one of which is shown.

It will be apparent that when the arm 129 is moved to the left as viewed in Fig. 1, the pull rod 124 moves leftward until the nuts 126 strike the pivot block 122. This pivots the arm 117 about its pivot point 118, and pulls the rod 113 to the right as viewed in Fig. 1. This motion moves the injector finger 88 inwardly. Simultaneously, the finger 87 is moved inwardly due to the coaction of the overlapping extensions 82 and 83. The lowermost blank is thus engaged by the lips 91 and is moved downwardly and rearwardly against the depending leg of the L-shaped blocks 107. In passing between the lower side of the horizontal legs of the blocks 107 and the plates 96, the latter move downwardly slightly against the force of springs 103, thus forming an escapement for the individual blank being pushed rearwardly. When the injector fingers move outwardly the plates 96 serve to support the column of blanks in the slot 41 in position for subsequent ejection of the lowermost blank. The blanks are thus positioned over the reduced portions 110 of the bosses 109, and rest against the enlarged diameter portions as shown in Fig. 26.

The above movements position the blank on the reduced portions 110 of the bosses 109 and beneath certain movable forming mechanisms adapted to bend the blank about the bosses. It is here to be noted that the blanks overhang the righthand boss 109 as viewed in Fig. 2, more than they overhang the lefthand boss. This, therefore, leaves one long end and one short end of the blank, it being understood in the particular embodiment shown my machine is adapted to twist the ends of the blank thereby to form the shank portion as will be explained, the hook portion of the hanger being formed by bending the single projecting long end of the blank after the shank is formed.

In order to prevent deflection of the pants bar portion of the hanger when the long and short ends are bent around, it is necessary to place slight rounded bends in the pants bar adjacent the ends thereof. My improved mechanism for so bending the ends of the pants bar portion of the hanger will now be described. Referring more particularly to Figs. 2 and 3 of the drawing, the plate 10 is provided with a pair of openings 137 and 138 disposed between and immediately adjacent the bosses 109. Projecting through the openings 137 and 138 are a pair of pins 139 and 141 disposed, upon downward movement, to engage the upper surface of the blank, thereby to place slight bends therein. The pin 139 is mounted in one end of an arm 142, pivotally mounted on a pin 143 secured to the rear side of the front plate 10. The pin 141 is mounted on an arm 144 pivotally mounted on a pin 146, likewise secured to the rear side of plate 10. Arm 142 is provided with an extension 147 disposed over a similar extension 148 carried by the arm 144. The arm 144 has secured to its rear side a bar 149 journaled at its rear end on a pin 151 passing through the rear plate 11. See Figs. 1 and 19. Depending from the rear end of the bar 149 is an arm 152. Pivotally connected to the lower end of the arm 152 is a pivot block 153. The threaded end 154 of a pull rod 156 is secured to the block 153 by means of nuts 157.

The other end of the pull rod 156 passes through a pivot block 158, pivotally mounted on the upper end of a lever 159, similar to the lever in Fig. 5, and journaled at its lower end on the shaft 133. The lever 159 carries on its side a roller 161 disposed to be struck by a cam 162, mounted on the cam shaft 18. See Fig. 18.

The functioning of the mechanism just described is as follows:

Upon leftward movement of the upper end of lever 159 as viewed in Fig. 1 pull rod 156 rocks the bar 149 clockwise as viewed in Figs. 3 and 19, moving pin 141 downwardly. The underhanging portion 148 of arm 144 engages the overhanging portion 147 of arm 142, thereby also moving pin 139 downwardly. The pins engage the top of the blank resting on the bosses 109 and place therein slight bends in the pants bar portion, as shown in Fig. 23. A small spring 163, having one end fixed to the rear side of arm 142 and the other end fixed to a strap 164, passing around rod 14, serves to pull the extension 147 into contact with the extension 148. A large spring 166 connected to the lower end of arm 152 and to a suitable portion of the framework at righthand end of the machine as viewed in Fig. 1, serves to pull the arm 152 to the right. The pins 139 and 141 contact the upper part of their respective slots 137 and 138 when not under the influence of the cam 162.

The next step in the formation of a hanger is to bend the ends of the blank across one another, then to bring the ends into parallelism. Mechanism for effecting this operation will now be described. Plate 10 is provided with circular slots 167 and 168 struck on a radius from the center of the bosses 109. Projecting through the slots 167 and 168 are pins 169 and 171, adapted to engage over the upper surface of the ends of the blank and to bend the same downwardly. As best shown in Fig. 3, pin 169 is mounted on the free end of an arm 172, carried by a boss 173, rotatably mounted on the end 174 of the lefthand rod 111, which passes concentrically through the boss 109 and through the plate 10. Pin 171 is mounted on the free end of an arm 176, carried on a boss 177, rotatably mounted on the end 178 of the righthand rod 111, which passes concentrically through the other boss 109, and through plate 10. The bosses 173 and 177 carry sprockets 179 and 181, respectively, fast on the rear ends thereof. A chain 182 has one end connected to a pull rod 183, and passes under the sprocket 181, thence under the sprocket 179, and thence over an idler sprocket 184 having a boss and rotatably mounted on a pin 126 secured to the plate 10. The chain passes downwardly from the sprocket 184 thence around a floating grooved sheave 187, and its end is fixed as at 188 to the lower end of a bracket 189 carried by the pin 186. As shown more clearly in Fig. 3, the flight of the chain 182 common to the sprockets 179 and 181 has interposed therein a take up link 190. By adjusting the length of the chain between the sprockets, the movement of the pins may be synchronized.

The other end of rod 183 passes through a pivot block 191 secured to the upper end of a lever 192, similar to the lever shown in Fig. 5. The lever 192 carries a roller 193 on one side disposed to be struck by a cam 194, see Fig. 12, mounted on the main cam shaft 18. A spring 196 has one end fastened to a depending yoke 197 carried by the pin 198 of the grooved sheave 187 and the other end fastened as at 201 to a bracket 202 fastened to the plate 10.

With reference to Fig. 23 of the drawing, it will be seen that the operations so far described have served to eject the blank B, position the same over the bosses 109, to place slight bends in the pants bar hanger portion P of the blank B, and to bend the short end S and the long end L thereof to the dotted line positions indicated. By means of mechanism to be described later, the short end S of the blank is caused to overlie the long end L thereof as viewed from the front of the machine, when crossed as indicated in the dotted lines Fig. 23. The next step is to bring the ends S and L of the blank into parallelism as indicated in Fig. 24 of the drawing preparatory to twisting the same to form the shank portion of the hanger. It will be understood that during the twisting operation later to follow, the pins 139—141, and 169—171 remain on contact with the blank B in the positions shown in Fig. 25 of the drawing to aid in preventing distortion of the previously formed bends.

Mounted on the front plate 10, centrally of the mechanism just described is an anvil 203. The anvil has a lug 204 depending midway between horizontal surfaces 206 at the lower side of the anvil. Adapted to cooperate with the anvil and the lug 204 thereof to bend the ends of the blank into the positions shown in Fig. 24 of the drawing are forming jaws 207 and 208. As shown more clearly in Fig. 4, the forming jaws are plates having backwardly sloping ends 209 and 211, respectively. The plates are mounted on the bottom of members 212 and 213, pivotally supported on studs 214 and 216, threaded into the rear side of plate 10. Each of the jaws 207 and 208 is provided with a notch 217 in which the wire blank engages as will be explained. The members 212 and 213 rock about the studs 214 and 216 to bring the jaws 207 and 208 to the position shown in Fig. 24 of the drawing, as will now be explained. Each jaw likewise is cut out as at 218 to provide clearance for the upper edge of plate 10 at the top of opening 15 therein.

Rotatably mounted on the rear of member 213, and at a point below the stud 216 is a sprocket 218. Pivotally connected at 219 to the member 212, at a point below the stud 214, is one end of a chain 221, which passes over and under sprocket 218. The opposite end of the chain is connected to a pull rod 222, and the other end of the pull rod passes through a pivot block 223 mounted on the upper end of a lever 224, similar to the lever shown in Fig. 5 of the drawing, and pivoted at its lower end on the shaft 133. The arm carries a roller 226 on its side disposed to cooperate with a cam 225, see Fig. 13, mounted on the main cam shaft 18. The members 212 and 213 are pulled outwardly against stops 227 and 228, respectively, by means of springs 229 and 231, connected at their other ends in suitable manner to a part of the framework. Upon rotation of the cam shaft 18, cam 225 contacts the roller 226, thereby moving the upper end of lever 224 to the left as viewed in Fig. 1 of the drawing, thus pulling the pull rod 222 to the left. This action causes the forming jaws to move inwardly bringing the short and long ends of the blank into parallelism as indicated in Fig. 24 of the drawing, and simultaneously forming the short portion adjacent the shank parallel with the pants bar portion P. It will be noted that the end of chain 221 is anchored at 119 to the pivoted member 212. By the laws of mechanics, it will be apparent that jaw 208 moves inwardly prior to jaw 207 thus positioning the long end L of the blank against the anvil before the arrival of the short end S. The rearwardly sloping ends 209 and 211 permit the ends of the blank to pass over the ends of the forming jaws when the former are brought around by the pins 169 and 171.

With the blank now bent as described up to the present, and held in the position indicated in Fig. 24 by the several mechanisms, the next step is to twist the shank. Referring now more particularly to Fig. 5 of the drawing, I show an arm 232 pivotally mounted on a relatively heavy pin 233 secured to the plate 10. The arm 232 carries a roller 234 disposed to be struck by a cam 236, see Fig. 11, to raise the free end of the arm 232.

Depending from the arm 232 closely adjacent the pin 233 and displaced slightly toward the free end of the arm is a bracket 237. Mounted on the end of the bracket 237 is another roller 238 likewise disposed in the path of the cam 236. Both of the rollers 234 and 238 may be mounted on eccentrics pivotally supported on studs 241, whereby the position of the rollers with respect to the cam may be adjusted thereby to control the upward movement of the free end of arm 232. It is to be noted that by this arrangement upward and downward movement of the arm 232 is obtained by means of the single cam 236, in the manner of a box cam, but that this arrangement of parts is considerably simplified over the usual box cam generally utilized for effecting such motions.

The free end of the arm 232 carries an inwardly projecting pin 242 mounted on the arm 232 by means of a stud 243 passing through a slot 244 provided in the arm 232. The end of the pin 242 carries a bearing 246, and disposed in the bearing is a rotatable shaft 247. The shaft 247 carries upper and lower sprockets 248 and 249.

Mounted in a suitable bearing 251 at the extreme end of the arm 232 is a shaft 252. Mounted on the upper end of the shaft 252 is a twister head indicated generally by the numeral 253. Mounted on the lower end of the shaft 252 is a sprocket 254 and a chain 256 connects the sprockets 249 and 254. Sprockets 248 and 254 are smaller in diameter than sprocket 249, thereby to compound rotary motion imparted by the shaft 247 to the twister head, as will now be explained.

A sprocket chain 257 has one end secured at 258 to a suitable stationary part of the framework and passes downwardly under a floating sprocket 259. The sprocket 259 has a yoke 261 fitting about its shaft 262, and a relatively heavy spring 263 is connected at its upper end to the yoke 261. The lower end of the spring 263 is connected at 264 to a suitable stationary part of the framework. The chain 257 passes upwardly and over an idler sprocket 266 rotatably mounted on the pin 233. The other end of the chain 257 is connected by a link 267 to one end of a chain 268 rotated at 90° with respect to the chain 257. The chain 268 passes over the sprocket 248 and its other end is connected to a pull rod 269. The pull rod 269 is threaded at its opposite end and passes through a pivot block 271, and is secured therein by means of nuts 272. The block 271 is pivotally mounted on the upper end of an arm 273 which in turn is pivotally mounted at its lower end on the shaft 133.

The arm 273 carries a roller 274 disposed to bear against the main cam shaft 18 and to be struck by a cam 276 carried by the cam shaft, see Fig. 14. The free end of arm 273 is thus moved to the left as viewed in Fig. 5 when its roller 274 is engaged by cam 276.

Referring more particularly to Fig. 7, the twister head 253 comprises a member having a conically concave surface 275 for guiding the free ends S and L of the blank thereinto. The body of the twister head preferably is formed of metal of the relative hardness of iron, and is provided with a bore 277 for receiving the shaft 252. A threaded opening 278 is provided for receiving a set screw 279, thereby to lock the head to the shaft 252. The bore 277 is reduced as indicated at 281, and is further reduced adjacent the concave surface 276 to provide an overhanging annular shoulder 282. An insert, formed preferably of tungsten carbide or similar material of the relative hardness of tungsten carbide, indicated by the numeral 283, is placed in the reduced portion of the bore and is soldered therein by means of a ring of silver solder 284. The insert is provided with an opening 286, elongated as indicated in Fig. 6 to receive the ends of the blank in side by side relation when twisting the same.

It will be apparent that upon rotation of the main cam shaft 18 in the direction indicated by arrow 287, Fig. 5, the arm 232 is moved up and down as the rollers 234 and 238 are engaged by the cam 236. This causes the twister head to engage about the parallel ends of the blank. At the proper time in the cycle of operation, cam 276 engages the roller 274 carried by the lever 273, hence to rotate the shaft 247 and thence the twister head 253, thereby to form the twisted shank 288, shown in Fig. 25. It is noted that the cam 276 is provided on its leading edge with a lobe 276a. The purpose of the lobe is to cause the twister head to rotate its maximum amount to form the twist, and then to back off slightly, thereby to free the head for removal from the twisted ends of the blank.

The next operation in forming the hanger is to place a hook in the projecting, untwisted long end L of the blank. Referring more particularly to Figs. 1, 2, and 21 of the drawings, I mount on the rear side of the front plate 10 upper and lower bearings 289 and 291, respectively. Rotatably mounted in the bearings 289 and 291 is a vertically disposed shaft 292. Secured to the shaft 292 and projecting toward the center of the machine is an arm 293. On the outer end of the arm is a bearing boss 294 in which is rotatably mounted a shaft 296. Secured to the front end of the shaft on the front side of the arm is a plate 297. Mounted for rotary movement with the plate 297 is a large roller 298 and a smaller roller 299. The rollers are disposed eccentrically with respect to the shaft 296, the roller 299 being disposed farther away from the center thereof than is the roller 298, in the manner well understood in the art.

Mounted on top of the bearing box 294 is an upstanding lug 300 carrying a forwardly projecting pin 301.

Mounted on the opposite end of the shaft 296 is a sprocket 302 over which passes a sprocket chain 303. The upper flight of the chain 303 connects at 304 to one end of a spring 306. The other end of the spring connects at 307 to a small bracket 308 secured to a rearwardly projecting bracket 309 fastened to the rear side of the plate 10.

Mounted fast on the bracket 309 is an upstanding pin 311 carrying an elongated boss 312 rotatably mounted thereabout. Adjacent its upper end the boss 312 has secured thereto, as by welding, an arcuate plate 313, and adjacent its lower end is a similar arcuate plate 314. A short length of chain 316 is secured at 317 to the plate 313 and extends around the curve thereof to join at 318 to a link 319. The link 319 connects with the other end of the chain 303 passing beneath the sprocket 302.

A length of chain 321 connects at 322 to the arcuate plate 314 and its other end is connected at 323 to one end of a pull rod 324. The pull rod 324 is connected at its other end to a pivot block 326 carried on the upper end of a lever 327, pivotally mounted at its lower end to the shaft 133, and similar in all respects to the lever 273. The lever 327 carries a roller 328 disposed to be struck by a cam 329 on the main cam shaft 18. See Fig. 15.

Projecting from the rear side of the arm 293 is a bracket 331 having pivotally mounted on the end thereof a pivot block 332. A pull rod 333 is secured at one end to the pivot block 332 and its other end is secured to another pivot block 334, carried on the upper end of a lever 336, similar in all respects to the lever 273, pivoted at its lower end on the shaft 133. The lever 336 carries a roller 337 disposed to cooperate with a cam 338, see Fig. 16. A spring 339 is connected to a pin 341 carried by a collar 340 on the upper end of pin 311, and at its other end to a pin 342 carried by the arm 331.

From the foregoing it will be apparent that when the pull rod 333 is moved leftward, the arm 293 carrying the hooker on its free end moves outwardly toward opening 15 in the front plate 10 of the machine, to position the rollers 298 and 299 on either side of the projecting long end L of the blank B. Upon leftward movement of the pull rod 324, the plate 297 carrying the rollers is rotated thereby to bend the hook on the end of the blank as shown in Fig. 25, the pin 301 acting as a stop to prevent bending of the twisted shank when the hooker bends the long end L to form the hook in slightly offset position. The cam 329 is provided with a lobe 329a on its leading edge. This raised portion causes the hooker to move to its maximum position, and then to back off slightly, thereby permitting the hooker to be withdrawn from the hook formed on the end L of the blank.

With the hanger thus formed, the pins 139—141 and 169—171, under control of their respective cams and return springs, move upwardly away from the blank and the same is ready for ejection when the arms 209 and 211 move away from the anvil 203. It is to be understood that during all of the foregoing forming operations, the blank was disposed immediately in front of the ejector mechanism now to be described so that upon outward actuation of the ejector, the completed hanger is delivered from the machine. That is to say, the ejector mechanism pushes each hanger outwardly where it is engaged by my improved friction holding mechanism, thereby to be pushed outwardly onto the delivery arms 111 by subsequently formed hangers.

Referring now more particularly to Figs. 3, 20, and 26, of the drawing, the ejector comprises a plate 341 cut away to provide a pair of upper arms 342, and a shorter pair of lower arms 343. The outer ends of the arms 342 are disposed closely adjacent the bosses 109 and are provided with downwardly extending short portions 344, the lower ends of which are tapered as indicated at 346.

The plate 341 is cut away at its center as indicated at 347 to straddle the anvil, and the arms 343 are provided on each end with tapered portions 348. As best shown in Fig. 22 of the drawing, the lefthand arm as viewed in Figs. 3 and 22, is thicker than the righthand arm, the purpose of which will be explained later.

The ejector plate is mounted on a shaft 351, slidable in suitable openings in the front and rear plates 10 and 11 of the frame. The shaft 351 is provided with an arm 352 secured thereto and carrying an upwardly extending plate 353. The upper end of the plate 353 engages slidably in a slot 354 formed in the lower side of the cross rod 14. A spring 356 is interposed between the end of the arm 352 and the front plate 10 whereby the shaft 351 is biased rearwardly of the machine.

Mounted rearwardly of the plate 11 is a collar 357 secured in any suitable manner to the end of the shaft 351. Connected to a lug 358 on the collar 357 is one end of a sprocket chain 359. The chain passes forwardly through a suitable opening provided in the rear plate 11, and around a sprocket 361 mounted on a bracket 362 projecting forwardly from the front side of the plate 11. The sprocket chain 359 has its opposite end secured to the pivot block 128 carried on the upper end of the lever 129, which it will be remembered is the lever which also actuates the injector mechanism. It will be apparent therefore, that upon leftward movement of the upper end of the lever 129, shaft 351 moves forwardly, thereby moving the ejector plate 341 outwardly of the front of the machine. This causes the ends of the arms 342 and 343 to engage the hanger at the sides and bottom and to move the same off the bosses 109 and anvil 203 and onto the delivery rods 111. As shown in Fig. 26, the portion of the hanger adjacent the shank thereof engages beneath a small plate 363 secured to the lower front of the anvil 203. The hanger is thus frictionally held at its corners on the rods 111 and at its shank by the plate 363. Upon formation of other hangers and their movement forwardly, the hangers are forced one at a time from beneath the plate 363, whereupon they are free to slide by gravity down the delivery rods 111 for removal from the machine. This arrangement prevents the hook ends of the hangers from swinging rearwardly where they would interfere with the formation of subsequent hangers.

It is to be noted that the relatively thick arm 343 on the left of the ejector mechanism serves to cause the short end S of the hanger blank to overlie the long end L thereof. That is to say, when the pins 169 and 171 swing their respective ends of the blank around, the short end is thrown farther forwardly due to striking the relatively thick lefthand arm 342 than is the long end L of the blank. Upon passing the thick section of the arm, the short end of the blank moves slightly rearwardly into contact with the long end L. Consequently, the short end overlies the long end so that when the shank is twisted, the short end is formed around the long end, it being noted that the twister rotates clockwise, as viewed in Fig. 6, to make the twist.

It will be understood that the various cams are arranged on the cam shaft to effect the sequence of operation as described. I have found after building a number of machines in accordance with the invention disclosed herein that the same are easy to time, that the sequence of functions described herein are extremely accurate with respect to timing, and that the machine may be operated at a relatively high speed. It will be noted that the lost motion connection between the arm 117 and the pull rod 123 permits the cam 132 to serve both for the injector and ejector mechanisms.

From the foregoing it will be apparent that I have devised an improved coat hanger machine which is fully effective for its intended purpose of forming wire garment hangers from pre-cut and pre-straightened blanks, and one which has a high rate of production with a minimum of wear on the moving parts.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. The combination with means to feed wire coat hanger blanks one at a time into position over laterally spaced stationary supporting devices, with the ends of the blank overhanging the supporting devices of a pair of pivotally mounted arms having free ends movable in arcuate paths about the supporting devices, a pin in the free end of each arm engageable above the overhanging ends of the blank to bend the same downwardly about the supporting devices, means for effecting simultaneous movement of the arms and pins comprising a sprocket operatively connected to each arm and rotatable therewith, a sprocket chain passing under and over one of said sprockets thence under and over the other sprocket, an idler sprocket over which the chain passes from the last named sprocket, a floating sheave under which the chain next passes from said idler sprocket, means anchoring the end of the chain after passing under the sheave, a tension spring connected at one end to the sheave and anchored at its other end, and a pull rod connected to the opposite end of the chain.

2. Apparatus as defined in claim 1 in which that flight of the chain common to both sprockets is provided with a takeup link whereby the length of said flight may be adjusted, thereby to synchronize the movement of the arms and pins carried thereby.

3. In apparatus for forming garment hangers from wire blanks, the combination with a hopper for receiving a plurality of blanks and having a vertically disposed slot at one end thereof through which the blanks pass one at a time, of a pair of resilient escapement mechanisms disposed beneath the slot for supporting the blanks, injector arms pivotally mounted adjacent the bottom of the slot, injector fingers on each arm disposed to engage the lowermost blank and remove it from the escapement mechanisms, a pair of stationary members beneath the slot for receiving and supporting the injected blanks with one end of the blanks overhanging one of said members farther than the other end overhangs the other of said members, a pair of pivotally mounted arms each carrying a pin on one end disposed upon rotation of the arms to engage the blank and place slight bends in the pants bar portion thereof, means to rotate one of the pivoted arms, means responsive to the rotation thereof to rotate the other pivoted arm, a third pair of pivotally mounted arms carrying other pins disposed upon rotation of the third pair of arms to engage the long and short ends of the blank and to bend the same about said stationary members with the ends overlapping, means common to both of the third arms to effect simultaneous rotation thereof, an anvil engaged by the crossed ends of the blank, a pair of pivotally mounted forming jaws, means common to the forming jaws for effecting movement thereof about their pivots toward the anvil thereby to engage the ends of the blank and bring the ends into parallelism by pressing the same against the anvil, said common means being constructed and arranged to effect rotation of the jaw acting on the long end before moving the other jaw, a twister head mounted for swinging movement to engage about the parallel ends of the blank, means to rotate the twister head thereby to twist the ends of the blank adjacent the anvil and leave a projecting portion of the long end untwisted, a rotary hook forming mechanism mounted for movement into engagement with the projecting long end of the blank, means to rotate the hook forming mechanism, an ejector embodying a plate disposed rearwardly of the blank being formed, a rod on which the plate is reciprocably mounted, means to move the ejector into engagement with the formed hanger thereby to remove the same from the stationary members, and a pair of rods projecting from the stationary members onto which the formed hanger is delivered by the ejector mechanism.

4. In apparatus for placing slight rounded bends adjacent the ends of the pants bar portion of coat hanger blanks, laterally spaced supporting means onto which the blanks are fed one at a time with the ends thereof overhanging the supporting means, a pair of arms pivotally mounted between the spaced supporting means and having the outer ends thereof movable downwardly in close proximity to the adjacent blank supporting means, an outstanding pin on the said outer end of each arm disposed to engage the blank inwardly of the associated blank support, overlapping contacting portions on the inner ends of the arms, means to rotate one of the arms in a direction to move the pins down onto the blank, a spring holding the overlapping portions of the arms in contact, and means on the outer sides of said supports holding the ends of the blank against upward movement while the pins are moved downwardly.

5. The combination with laterally spaced stationary means for supporting a wire coat hanger blank while being formed and means to position the blanks one at a time on the supporting means with the ends overhanging the supporting means, of means to bend the overhanging blank ends around the holding means and cross the same, an anvil located between the supporting means and embodying a depending lug disposed to be engaged at opposite sides by the crossed ends of the blank, means cooperating with the anvil and lug to bend the blank ends downwardly of the anvil and into parallelism comprising a pair of members pivotally mounted at either side of the anvil and having free ends movable toward the anvil and lug, forming jaws on the free ends of the members disposed to engage the ends of the blank and press them against the anvil and lug, a chain having one end secured to one of the members at a point between the pivot and free end thereof, a sprocket rotatably mounted on the other member at a point between the pivot and free end thereof over which said chain passes, a cam operatively connected to the other end of the chain for pulling the same thereby to move the members carrying the forming jaws toward the anvil, and spring means biasing the free ends of the members away from the anvil.

6. Apparatus as defined in claim 5 in which the forming jaw of the member having the chain secured thereto contacts the short end of the blank, and in which the other jaw contacts the long end of the blank, whereby the long end of the blank is bent downwardly ahead of the short end.

OLIVER R. BREKLE.

References Cited in the file of this patent
UNITED STATES PATENTS

| Number | Name | Date |
|---|---|---|
| 1,050,348 | Cronandier | Jan. 14, 1913 |
| 1,277,234 | McKenna | Aug. 27, 1918 |
| 1,550,824 | Kuester | Aug. 25, 1925 |
| 1,679,204 | Coney | July 31, 1928 |
| 1,695,603 | Magidson | Dec. 18, 1928 |
| 1,888,803 | Moore | Nov. 22, 1932 |
| 1,906,741 | Coney | May 2, 1933 |
| 1,968,305 | Moore | July 31, 1934 |
| 1,968,306 | Moore | July 31, 1934 |
| 1,968,307 | Moore | July 31, 1934 |
| 2,035,658 | Lewis | Mar. 31, 1936 |
| 2,081,167 | Brownstein | May 25, 1937 |
| 2,093,173 | Olson | Sept. 14, 1937 |
| 2,152,109 | Todd | Mar. 28, 1939 |
| 2,162,669 | Boyles | June 13, 1939 |